(12) United States Patent
Naydenkov et al.

(10) Patent No.: US 6,890,450 B2
(45) Date of Patent: May 10, 2005

(54) METHOD OF PROVIDING OPTICAL QUALITY SILICON SURFACE

(75) Inventors: Mikhail N. Naydenkov, Los Angeles, CA (US); Quyen T. Huynh, Garden Grove, CA (US); Sivasubramaniam S. Yegnanarayanan, Los Angeles, CA (US)

(73) Assignee: Intel Corporation, Santa Clara, CA (US)

(*) Notice: Subject to any disclaimer, the term of this patent is extended or adjusted under 35 U.S.C. 154(b) by 279 days.

(21) Appl. No.: 09/953,391

(22) Filed: Sep. 14, 2001

(65) Prior Publication Data

US 2002/0104822 A1 Aug. 8, 2002

Related U.S. Application Data

(60) Provisional application No. 60/266,254, filed on Feb. 2, 2001.

(51) Int. Cl.[7] .............................. H01L 21/00; B29D 11/00

(52) U.S. Cl. ........................................ 216/24; 438/31

(58) Field of Search .................... 216/24, 38, 99, 216/79, 80; 438/29, 31, 719, 753, 723, 756

(56) References Cited

U.S. PATENT DOCUMENTS

| | | | |
|---|---|---|---|
| 4,787,691 A | | 11/1988 | Lorenzo et al. |
| 4,789,642 A | | 12/1988 | Lorenzo et al. |
| 5,337,398 A | | 8/1994 | Benzoni et al. |
| 5,787,214 A | | 7/1998 | Harpin et al. |
| 5,908,305 A | * | 6/1999 | Crampton et al. .......... 438/141 |
| 2002/0031321 A1 | * | 3/2002 | Lee et al. ................... 385/129 |
| 2002/0104822 A1 | * | 8/2002 | Naydenkov et al. .......... 216/24 |

FOREIGN PATENT DOCUMENTS

| | | |
|---|---|---|
| EP | 1037272 | 9/2000 |
| EP | 1120818 | 8/2001 |

OTHER PUBLICATIONS

W. H. Juan and S. W. Pang "Controlling Sidewall Smoothness for Micromachined Si Mirrors and Lenses" Jornal of Vacuum Science and Technology Part B. American Institute of Physics, New York, US. vol. 14, No. 6 Dec. 1996, pp. 4080–4084.*

A.G. Rickman and G.T. Reed. Silicon on Insulator Optical Rib Waveguides: loss, mode characteristics, bends, and Y–junctions IEE Proc. Optoelectron., vol. 141 No. 6 Dec. 1994, pp. 391–393.*

"Fabrication of High Aspect Ratio Photonic Bandgap Structures on Silicon–on–Insulator", Mikhail Naydenkov, et al.— Proceedings of SPIE Photonics West, vol. 3936, San Jose, CA, Jan. 24–25, 2000.

Juan. W.H., et al.: "Controlling Sidewall smoothness for Micromachined Si Mirrors and Lenses." Journal of Vacuum Science and Technology: Part B, American Institute of Physics. New York, US, vol. 14, No. 6, Dec. 1996 (1996j–12), pp. 4080–4084, XP002200112; ISSN: 0734–211X.

(Continued)

*Primary Examiner*—Gregory Mills
*Assistant Examiner*—Roberts Culbert
(74) *Attorney, Agent, or Firm*—Pillsbury Winthrop LLP (57) ABSTRACT

A system and method for making an optical quality silicon surface on optical systems, including integrated optical waveguide device structures, is provided. A rough surface is formed through a dry etching process. Thermal oxide is grown on the surface either by a wet or dry oxidation process. A HF based solution is used to etch the grown oxide, reducing the surface roughness. The process may be performed repeatedly in order to obtain the desired amount of smoothness.

42 Claims, 8 Drawing Sheets

OTHER PUBLICATIONS

Yahata, A. et al.: "Smoothing of SI Trench Sidewall Surface By Chemical Dry Etching And Sacrificial Oxidation." Japanese Journal of Applied Physics, Publication Office Japanese Journal of Applied Physics. Tokyo, JP, vol. 37, No. 7, Jul. 1998 (1998–07), pp. 3954–3955, XP000822994; ISSN: 0021–4922.

Yahata, A. et al.: "Effect of Trench–Sidewall Smoothing On On–State Voltage of Injection Enhancement Gate Transistor." Proceedings of the $10^{TH}$ International Symposium on Power Semiconductor Devices & IC's. ISPSD '98. Kyoto, Jun. 3–6, 1998. International Symposium on Power Semiconductor Devices & IC's, New York, NY, IEEE, US, Jun. 3, 1998 (1998–06–03), pp. 273–276, XP000801078; ISBN: 0–7803–4752–8.

* cited by examiner

METHOD OF PROVIDING OPTICAL QUALITY SILICON SURFACE

This application claims the benefit of Provisional Application No. 60/266,254, filed Feb. 2, 2001.

BACKGROUND OF THE INVENTION

1. Field of the Invention

The present invention relates to processes that improve transmission properties of optical systems, and more particularly to a system and method for reducing surface roughness and providing an optical quality silicon surface in optical devices, including integrated optical waveguide device structures.

2. Discussion of the Related Art

As optical system architectures have matured, the use of innovative and cost-effective packaging of optoelectronic components has migrated from relatively simple laser and photodetector submounts to more sophisticated hybrid integrated optical subsystems. This is fuelled by the emergence and maturity of the optical layer and the requirement for increased optical layer functionality. Simultaneously, the gradual migration of optical devices to the edge of the network and ultimately to the individual user, requires the implementations of small, low-cost and highly functional optoelectronic components.

Silicon optical bench (SiOB) technology was developed to take advantage of planar lightwave circuit devices using glass-on-silicon technology. SiOB technology also takes advantage of silicon processing for realizing V-grooves, fiducial and alignment marks, mechanical rails for passive alignment, solder dams and solder evaporation, etc. However, the presence of large buffer layers on silicon and weak optical waveguiding in the SiOB technology result in large bend radii. Thus, large real estate is required for lightwave circuit devices.

Silicon-on-insulator (SOI) was then developed as a promising substrate material for the realization of integrated optical devices, including optical waveguide device structures. SOI has recently emerged as a commercially viable, low-cost, integrated optical waveguide technology. Examples of technology using SOI are disclosed in U.S. Pat. Nos. 4,789,642, 5,787,214 and 4,789,691. SOI provides a readily available planar waveguide solution that is advantageous due to the availability of silicon substrates being directly compatible with other silicon processing. Silicon may be used as an optical bench to realize fiducials, alignment marks and passive grooves for hybrid assembly of active devices, and optical fibers with passive waveguide structures on SOI.

To define optical devices and other alignment structures that utilize SOI as the substrate material, there are two possible approaches with the existing technology: a wet etching technique and a dry etching technique. Wet etching typically deals with etching done utilizing a liquid etch, such as buffered oxide etches. Dry etching typically is performed in a reactive gas and/or plasma discharge gas environment. Each of these etching techniques has its attributes. In general, they are used in specific situations for which they are best suited. While wet etching may be used to obtain optically smooth surfaces, it tends to be preferential along crystallographic planes. Furthermore, wet etching provides an isotropic etch without sufficient flexibility in the optical device structures, and in particular for realizing deep aspect ratio structures. As a result, wet etching usually yields non-vertical etched walls, a wall with a curved surface, or an unacceptably small vertical to horizontal etched aspect ratio. Therefore, wet etching is generally not appropriate for applications such as forming waveguides in optical devices or forming other structures where vertical walls and/or high aspect ratios are required.

On the other hand, dry etching is often used for applications in which wet etching is not appropriate, e.g., applications where a vertical wall with a high aspect ratio is required, such as forming waveguides in optical devices. Two commonly used dry etch techniques are regular dry etching and deep reactive-ion-etching (RIE). Due to its highly anisotropic etching, dry etching is very advantageous for realizing flexible optical device structures with deep aspect ratios. However, dry etching introduces surface roughness that causes significant optical loss. Because of the very large refractive index difference between the silicon waveguide core and the cladding, e.g., air or other dielectric material, silicon surface roughness can produce significant optical loss. Moreover, light beams processed in an integrated optical component typically propagate in a direction parallel to the surface of the substrate. To avoid distortion of the propagating light with an associated loss of information, it is often necessary that the walls of optical devices in the integrated component be essentially vertical and smooth. Therefore, there is a need for a system and method to reduce surface roughness of the silicon surface on structures with high aspect ratio topographic features, so that the transmission properties of waveguides and waveguide facets formed by dry etching are improved.

BRIEF DESCRIPTION OF THE DRAWINGS

The accompanying drawings, which are incorporated in and form a part of this specification, illustrate embodiments of the present invention and, together with the description, serve to explain the principles of the present invention.

DETAILED DESCRIPTION

Reference will now be made in detail to the preferred embodiments of the invention, examples of which are illustrated in the accompanying drawings. While the present invention will be described in conjunction with the preferred embodiments, it will be understood that they are not intended to limit the invention to these embodiments. On the contrary, the present invention is intended to cover alternatives, modifications and equivalents, which may be included within the spirit and scope of the invention as defined by the appended claims. Moreover, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components and circuits have not been described in detail as not to unnecessarily obscure aspects of the present invention.

Embodiments of the present invention are directed to providing an optical quality silicon surface in planar integrated products for optical systems, including integrated optical waveguide device structures. The present invention achieves this by decreasing the surface roughness of the silicon surface in these optical systems. Planar integrated products are expected to become preferred over dielectric filter based wavelength multiplexing and demultiplexing products for advanced systems. The power of integrated circuit style batch processing utilized in manufacturing planar waveguide devices lowers manufacturing costs. The characteristics of low optical propagation loss, ease of fabrication, ability to add new optical/optoelectronic functionality and readily available active waveguides have spawned a variety of integrated optic technologies. These technologies include modulators and switch arrays in Lithium Niobate, III-V and compound semiconductor photonic integrated circuits, Silica-on-silicon, polymer, ion-exchange glass, and SOI.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
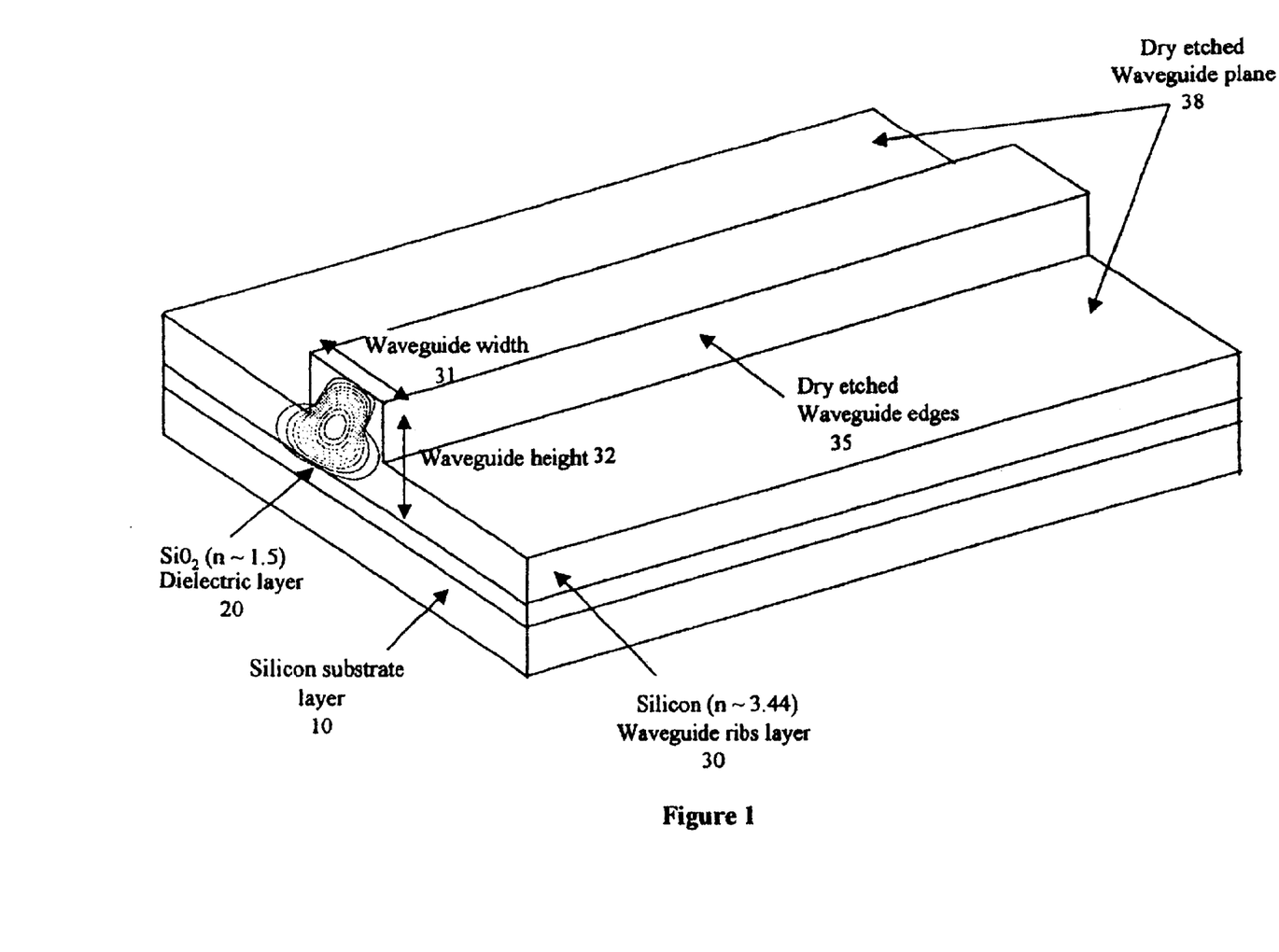
FIG. 1 illustrates an example of a SOI optical waveguide in which embodiments of the present invention operate.

FIG. 1 shows a schematic of an SOI optical waveguide structure and an optical mode in which embodiments of the present invention may function. SOI allows low-cost integrated optical waveguide technology to be implemented. There are several unique advantages in an SOI system. First, silicon provides low optical propagation loss within the long-wavelength telecommunication band, e.g., $\lambda > 1.2$ $\mu$m. Second, there is direct compatibility between this technology and microelectronic IC fabrication techniques. Third, silicon allows for the possibility of electro-optic or thermo-optic tuning. Fourth, high aspect ratio photonic bandgap structures are allowed to be formed (See M. N. Naydenkov and B. Jalali, "Fabrication of high aspect ratio photonic bandgap structures on silicon-on-insulator", Proceedings of SPIE, Vol. 3936, pp. 33–39, 2000). Fifth, the large index contrast between silicon (n~3.44) and $SiO_2$ (n~1.44) enables highly functional passive optical waveguide device structures to be integrated in a small area. Finally, hybrid integration with optoelectronic devices may be obtained by utilizing well-known silicon optical bench technology (See U.S. Pat. No. 5,337,398 and "Silicon Optical Bench Waveguide Technology" by Yuan P. Li and Charles H. Henry, pp 319–376, Academic Press, 1997).

Optical waveguides in the SOI optical waveguide structure in FIG. 1 can be designed for attachment to and operation with conventional single-mode or multi-mode optical waveguide fibers. The SOI optical waveguide structure comprises a lower silicon substrate layer 10, a dielectric layer 20, and a waveguide rib layer 30. In a preferred embodiment, a crystalline silicon substrate is subjected to ion implantation to form a dielectric layer 20 below the surface of the crystalline silicon substrate but above the lower silicon substrate layer 10. High energy ionized oxygen or nitrogen species are implanted in the crystalline silicon substrate in order to convert this buried layer of silicon into silicon dielectric compounds such as silicon oxide ($SiO_2$) or silicon nitride ($Si_3N_4$). In FIG. 1, $SiO_2$ is depicted as the dielectric layer 20. The depth of the buried dielectric layer 20 is typically 0.5 to 1 micron and is controlled by the implant energy and silicon flux. The top waveguide rib layer 30 may be made thicker by a separate epitaxial growth step following the ion-implantation, and a thickness between 0.2–10 micron is routinely possible. One of the functions of the dielectric layer 20 maintained beneath the waveguide rib layer 30 is to prevent tailing of optical signals into the silicon substrate layer 10. The dielectric layer 20 prevents significant penetration of signals through the dielectric and into the lower silicon substrate layer 10.

The silicon substrate is then etched and patterned to provide exposed waveguide edges in the waveguide rib layer 30 of crystalline silicon, which sits on top of the dielectric layer 20. The patterning can involve wet or dry etching techniques. In FIG. 1, a straight-channeled waveguide is geometrically patterned to provide for a lateral confinement of optical signals. In other embodiments, other type optical devices and alignment structures are realized by utilizing SOI as the substrate material. In one embodiment of the straight-channeled waveguide, the waveguide is substantially rectangular in cross section, with waveguide width 31 and waveguide height 32 as indicated in FIG. 1. The waveguide may, for example, be approximately 10 microns high by 8 microns wide. Alternatively, other dimensions and shapes may be used for waveguides in an SOI optical waveguide structure. With the configuration shown in FIG. 1, a high refractive index contrast is created in the SOI waveguide system. The refractive index of the waveguide rib layer 30 of crystalline silicon is about 3.44. The refractive index of the $SiO_2$ dielectric layer 20 is about 1.5. If $Si_3N_4$ is used as the dielectric layer 20, then the refractive index thereof is about 1.96. The waveguide is optically isolated due to this high refractive index contrast.

In one embodiment, anisotropic RIE, which can create isolation regions less than one micron wide and several microns deep, is used to create optical waveguide edges 35 and optical waveguide plane 38 in the waveguide rib layer 30. In this process, an RIE etch mask is formed over the silicon substrate to expose regions where trenches are to be formed. The mask structure and thickness depend upon the chemistry and conditions of the RIE to be used. In a dry etching process, a discharge in a gas is provided and the waveguide rib layer 30 is etched by chemical entities formed in the discharge. The etching is ultimately achieved through chemical reaction of the discharge entities with the waveguide rib layer 30 of the SOI substrate. The dry etch can take one or more steps to etch the SOI. In one implementation, this etching process is accompanied by enhanced removal of material in the waveguide rib layer 30 through kinetic impact of the gas discharge entities with the substrate.

According to an embodiment, a particular RIE process, commonly known as the Bosch process, is utilized to perform the etching. In one implementation, a PlasmaTherm SLR 770 ICP is used to perform the etching. An inductively coupled plasma generator generates a dense plasma near the top electrode. A capacitively coupled second RIE generator is used to independently bias the substrate. The Bosch process uses a series of alternating depositions and etches to maintain low undercut and vertical sidewalls, forming dry etched waveguide edges 35 shown in FIG. 1. While the Bosch process results in an etch that is highly anisotropic, the series of alternating depositions and etches produces rippling of the etch surface. Examples of such ripples are displayed in FIG. 2.

The dry etched waveguide edges 35 and the optical waveguide plane 38 formed from the dry etch cause roughness on the optical waveguide surface. Additionally, ion assisted plasma etching often causes substantial damage near the surface of the etched edges. Such surface damage can cause degradation both to optical and electrical properties while impeding subsequent epitaxial deposition. The rough surface characteristic interacts strongly with the optical mode and causes scattering losses. To provide optical quality dry etched optical device structures, a thermal oxidation and etch process is utilized.

Following the dry etching processes and after formation of the optical waveguide structures, a thermal oxide is grown on the surface of the optical waveguide structures. The thermal oxide may, for example, be grown by wet or dry oxidation of silicon. In one implementation an oxidation furnace, such as a Tygstar I, is utilized to perform the wet or dry oxidation. In most instances, the silicon substrate needs to be clear of metals or organics prior to entering the oxidation furnace. In one implementation, the cleaning process is accomplished using a standard pre-furnace cleaning process with a 17:1 $H_2SO_4$:$H_2O_2$ piranha solution at a temperature of 100° C. In other implementation, other kinds of pre-furnace cleaning process are used. Dry oxidation may, for example, be performed in the furnace tube with a flow of oxygen gas. In one example of a wet oxidation, a separate torch is utilized to allow hydrogen to flow in addition to the oxygen gas. The introduction of $H_2$ gas in the furnace enables a steam oxidation, or wet oxidation, to occur. A nitrogen carrier is used for purging during the loading and unloading of the sample. Typical oxide thickness grown in each step is approximately 250 nm. For oxide thickness in this range of 250 nm, wet oxidation is preferred as the oxidation rate is much faster than dry oxidation. In the oxidation process, temperature is a key parameter in oxide growth. The temperature of a substrate controls the growth rate of the oxidation process because it governs the diffusion coefficient of the oxygen ions in silicon lattice. For example, wet oxidation is performed at a furnace temperature of 800–1100° C.

Following the thermal oxide growth step, a hydrofluoric acid (HF) based solution is used to etch the grown oxide. In one implementation, the wafer, or the SOI, loaded in an etch-resistant boat is immersed in a tank of the HF based solution. HF has the advantage of dissolving silicon dioxide without attacking the silicon. The HF based solution may, for example, be buffered using a mixture of water and ammonium fluoride, resulting in buffered oxide etches (BOE). HF etches the grown oxide by converting the oxide into $H_2SiF_6$, which dissolves in water. Although full strength HF may be used, a diluted concentration of HF is typically utilized. Full strength HF has an etch rate of 300 A/sec at room temperature, which is often too fast for a controllable process. In this embodiment, the oxidation and etch process is performed once to smooth the waveguide edges 35. In other embodiments, this oxidation and etch process is repeated in order to obtain the desired smoothness. Because the process can be repeated to obtain a smoother surface, it is suitable for multiple controllable smoothing applications.

In one embodiment, this etch smoothing may be particularly advantageous for realizing optical quality facets that may be used to realize etches perpendicular to the optical waveguide. This improves the optical quality by minimizing losses due to scattering of the light and significantly reduces the surface scattering losses of the waveguide. For example, the waveguide scattering loss using Fabry-Perot resonance fringe contrast of straight waveguide samples butt coupled to a single-mode optical fiber shows an improvement of loss from 2 dBcm to 0.2 dBcm. In other embodiments, etches are realized at an angle to realize a low back-reflection interface between the optical waveguide and input/output fiber. Angles of a few degree, e.g., less than 12 degree, are useful in reducing backscatter significantly. This effect is well known in the art and is routinely used to realize low back-reflection in single-mode fiber to single mode-fiber connections. For example, an FC-APC and FC-UPC (8 degree) fiber end-face results in reducing the backscatter by 20 dB as compared to FC-PC, which has a flat polished end-face. The smoothing of the surface of the angled facet results in reducing the surface roughness induced optical scattering losses, further optimizing the backscatter reduction.

Figure 2:
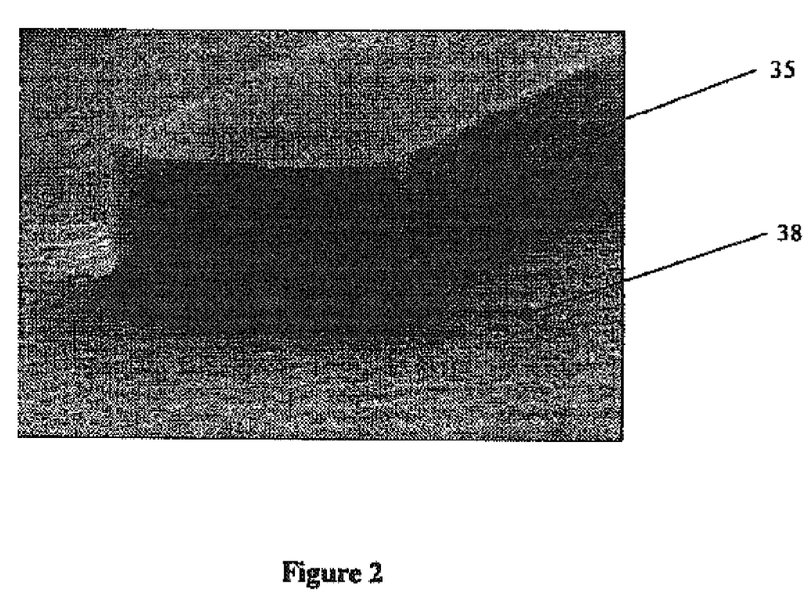
FIG. 2 shows an optical device under a scanning electron microscope (SEM) after etching and prior to surface treatment according to an embodiment of the present invention.
Figure 3:
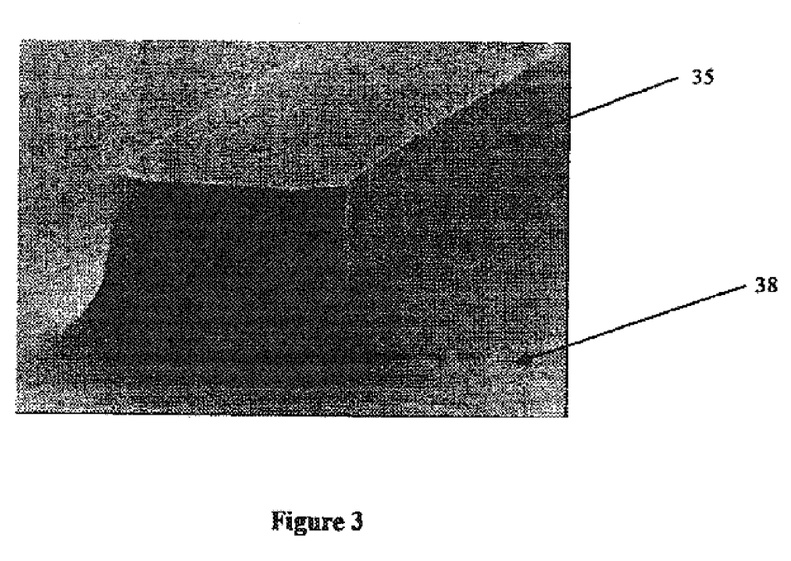
FIG. 3 shows an optical device under an SEM after surface treatment according to an embodiment of the present invention.

FIGS. 2 and 3 show images under an SEM of an optical device before and after the surface treatment, respectively, according to embodiments of the present invention. In the SEM pictures, a pre-image and post-image of a portion of the silicon rib waveguide on the waveguide rib layer 30 are shown. As illustrated in FIG. 2, due to plasma etching, significant roughness is observed on the dry etched waveguide edge 35 and waveguide plane 38 prior to the oxidation growth and etching process. The marks seen in the waveguide edge 35 are a result of scalloping that is a by-product of using the etching process, such as the Bosch process.

After the formation of the optical waveguide structures, a thermal oxide is grown on the silicon surface. The oxide growth is typically achieved by a diffusion process whereby oxygen diffuses through an oxide layer growing on the silicon surface, into the silicon substrate, forming fresh oxide. The diffusion rate depends on the surface contour, and surface roughness results in different oxidation rates at peaks and troughs on the silicon surface. The oxidation rate at peaks is faster than that of troughs. As a result, in the oxide growth step, more fresh oxide is formed at the peaks than at the troughs on the silicon surface. The thermal oxide grown is then etched with, for example, a HF based solution, exposing fresh silicon. The post-image shown in FIG. 3 is taken after two cycles of oxidation growth and etching processing. As illustrated in FIG. 3, the surface of the waveguide, at both the waveguide edge 35 and the waveguide plane 38, is considerably smoother. It should be noted that further smoothing of the surface can be obtained by multiple process cycles at the expense of reducing the silicon layer thickness.

Figure 4:
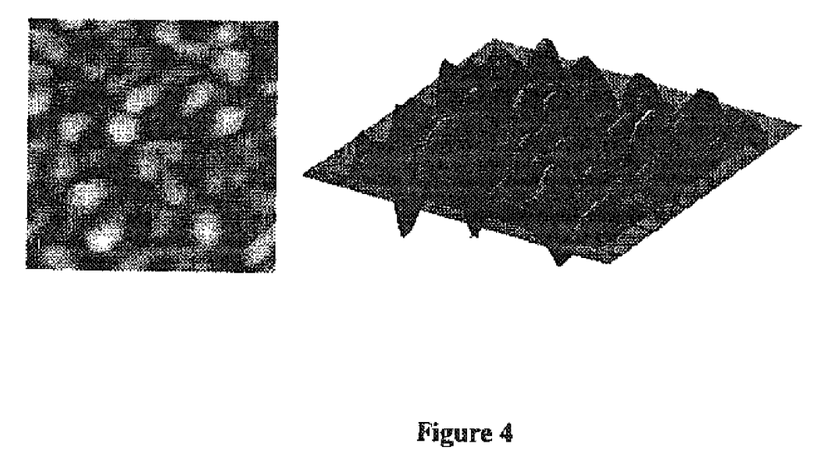
FIG. 4 illustrates an atomic force microscope (AFM) picture of a silicon surface after etching and prior to surface treatment according to an embodiment of the present invention.

FIG. 4 illustrates an atomic force microscope (AFM) picture of a silicon surface after etching of ~1 $\mu$m and prior to surface treatment according to an embodiment of the present invention. A root-mean-square (RMS) surface roughness of 43.3 angstrom (A) is observed by the AFM. In the figure, an area of approximately 1 $\mu$m by 1 $\mu$m is shown. The height of the peaks on the silicon surface ranges from 0 Å to 139 Å.

Figure 5:
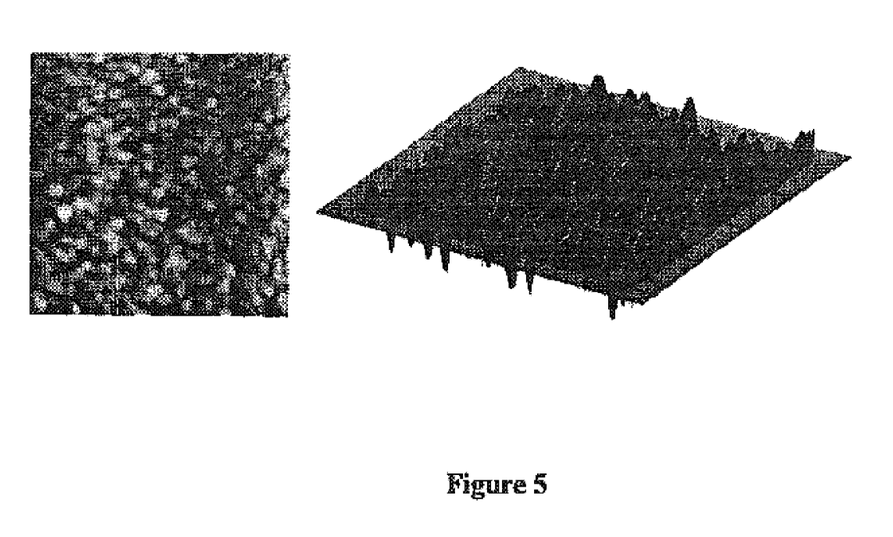
FIG. 5 illustrates an AFM picture of a silicon surface after a first surface treatment according to an embodiment of the present invention.
Figure 6:
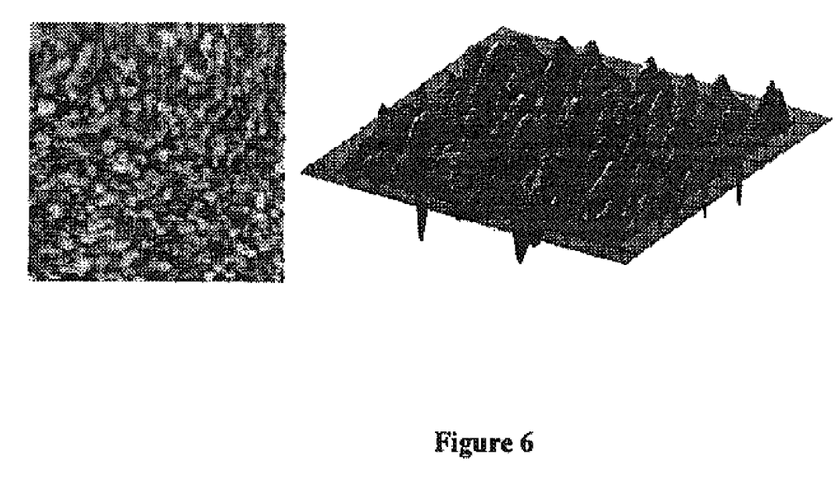
FIG. 6 illustrates an AFM picture of a silicon surface after a second surface treatment according to an embodiment of the present invention.

FIG. 5 illustrates an AFM picture of a silicon surface after the first surface treatment according to an embodiment of the present invention. Here, an area of approximately 4 $\mu$m by 4 $\mu$m is shown. In this embodiment, a thermal oxidation of 250 nm is formed and a subsequent BOE is performed. In FIG. 5, an RMS surface roughness of 27.2 Å is observed, which is lower than the one obtained before the treatment. The height of the peaks on the silicon surface ranges from 0 Å to 96.1 Å, which is a smaller range than the one obtained before the treatment. Repeating the above oxidation and etch cycle results in further reduction in the surface roughness. FIG. 6 illustrates an AFM picture of a silicon surface after the second surface treatment according to an embodiment of the present invention. After the second cycle of oxidation and BOE etching, the RMS surface roughness is observed to be 15.1 Å, with the length of the peaks ranging from 0 Å to 42.7 Å.

Figure 7A:
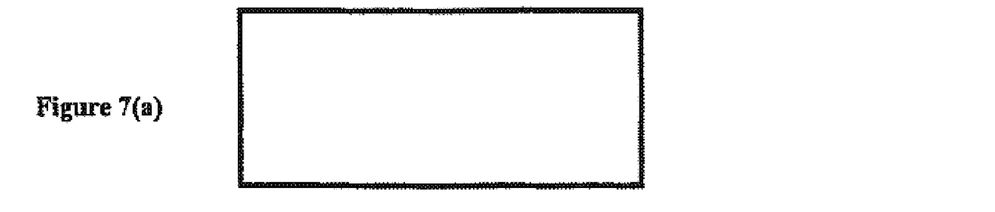
FIGS. 7(a)–(g) illustrate processes for providing an optical quality silicon surface according to embodiments of the present invention.

A method for providing an optical quality silicon surface according to an embodiment of the present invention will now be described with reference to FIGS. 7(a)–7(g). As an illustrative example, an SOI optical waveguide structure is first created. In other embodiments, other structures are formed. FIG. 7(a) illustrates a cross-sectional view of the starting material—a crystalline silicon substrate.

Figure 7B:
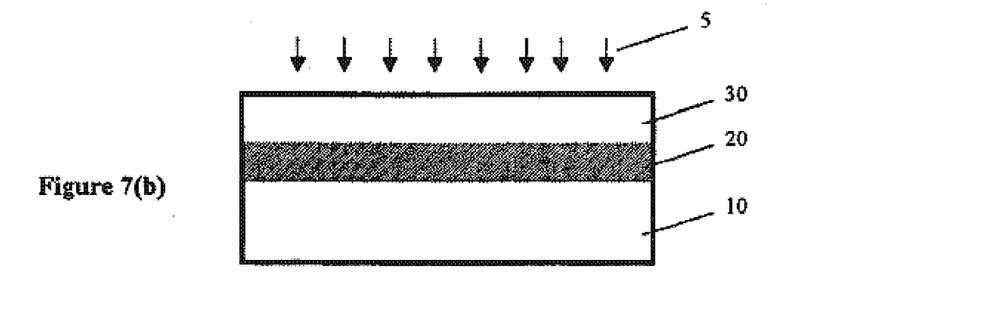

In FIG. 7(b), the crystalline silicon substrate is subjected to ion implantation to form a dielectric layer 20 below the surface of the crystalline silicon substrate but above a lower silicon substrate layer 10. High energy ionized species 5 are implanted to from the silicon dielectric layer 20. The layer above the dielectric layer 20 is a waveguide rib layer 30, where optical waveguides are to be formed.

Figure 7C:
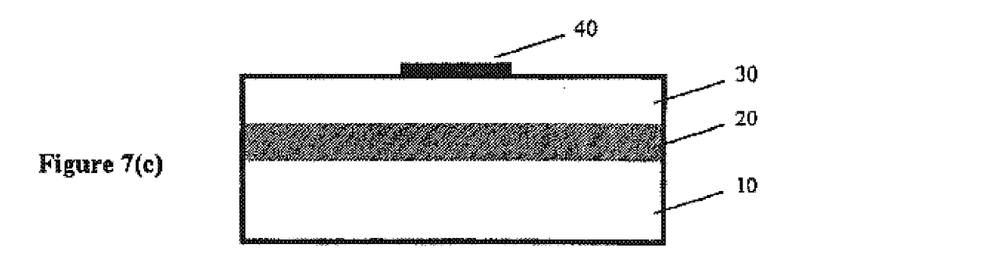

In FIG. 7(c), a mask 40 is placed on top of the waveguide rib layer 30 to expose regions where trenches are to be formed. This allows an etching technique, such as anisotropic RIE, to be carried out to form an optical waveguide in the waveguide rib layer 30.

Figure 7D:
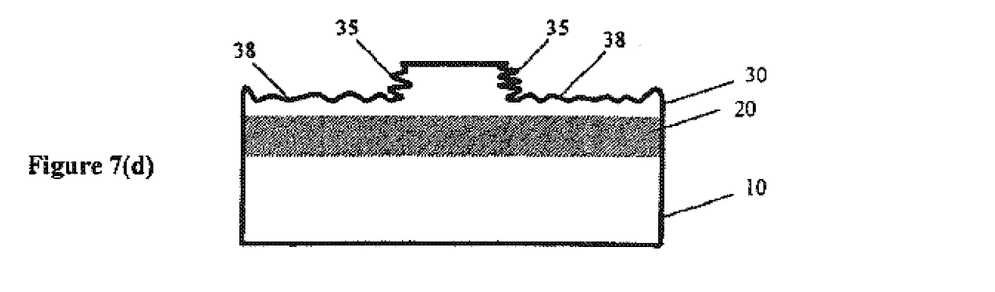

In FIG. 7(d), the waveguide rib layer 30 is etched and patterned to provide exposed waveguide edges 35 and exposed waveguide plane 38. The mask 40 is removed after the etching. As shown in FIG. 7(d), rough surfaces are formed for both the waveguide edges 35 and exposed waveguide plane 38, symbolized by the peaks and troughs thereon. In one implementation, the rippling of the etched surface is the result of a series of alternating depositions and etches of the etching technique.

Figure 7E:
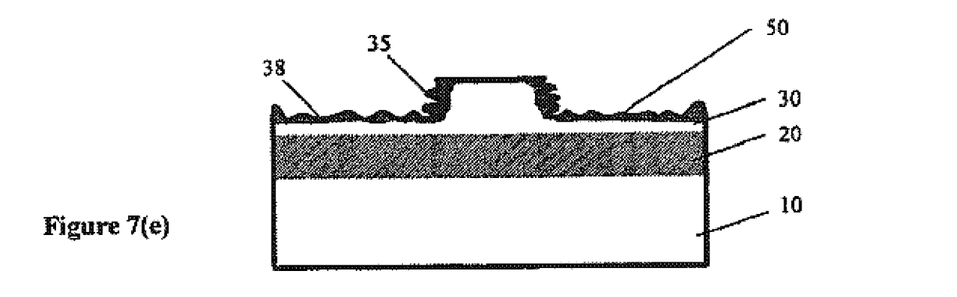

A thermal oxidation growth step follows the etching shown in FIG. 7(d). In FIG. 7(e), a layer of thermal oxide 50 is created on the surface of the optical waveguide structure, including the waveguide edges 35 and exposed waveguide plane 38. The thermal oxide may, for example, be grown by wet or dry oxidation of silicon. The oxide growth is typically a diffusion process whereby oxygen diffuses through the oxide layer growing on the silicon surface, into the waveguide rib layer 30, forming fresh oxide. The diffusion rate depends on the surface contour, and surface roughness results in different oxidation rates at peaks and troughs on the silicon surface.

Figure 7F:
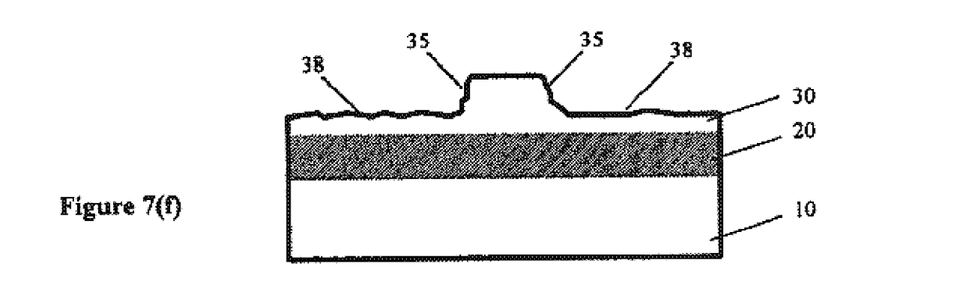

The thermal oxide is then etched with a HF based solution, exposing fresh silicon on the waveguide rib layer 30, as shown in FIG. 7(f). As shown in FIG. 7(f), the waveguide edges 35 and the exposed waveguide plane 38 are much smoother than before (see FIG. 7(d)), with the rippling of the etched surface being minimized. The thermal oxide growth step and subsequent etching of the grown oxide cycle can be repeated to obtain desired smoothness of the surface.

Figure 7G:
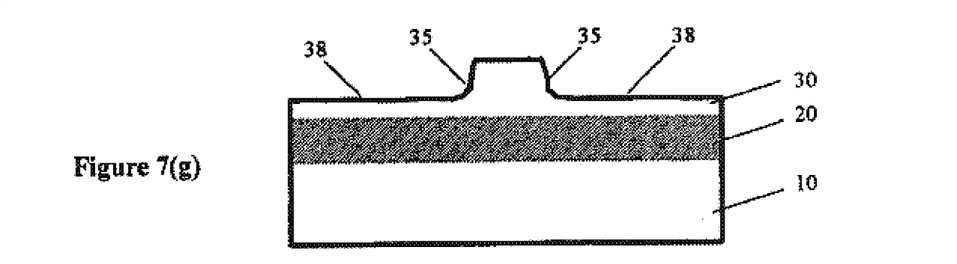

FIG. 7(g) illustrates the optical waveguide structure after a second cycle of the thermal oxide growth and subsequent etching. As shown in this figure, the waveguide edges 35 and the exposed waveguide plane 38 of the resultant structure is even smoother as compared to the optical waveguide structure in FIG. 7(f).

Low-loss optical trenches/dry-etched waveguide facets are realized using this method. With surface scattering losses being minimized, optical quality is improved. This enables waveguides to be better interfaced with external optical fibers or other active optoelectronic components. Examples of such optoelectronic components are lasers and photodetectors. This ability to turn a dry etched rough silicon surface into an optical quality smooth surface gives much needed flexibility in the fabrication of silicon optical sub-assemblies.

While the foregoing description refers to particular embodiments of the present invention, it will be understood that the particular embodiments have been presented for purposes of illustration and description. They are not intended to be exhaustive or to limit the invention to the precise forms disclosed. Many modifications and variations are possible in light of the above teachings and may be made without departing from the spirit thereof For example, in FIGS. 7(a)–7(g), both edges and planes are smoothed together in each cycle of the oxidation growth and etching process. In one variation, the edges and planes may be separately smoothed, so that a certain degree of surface smoothness is achieved for the edge(s) and another degree of surface smoothness is achieved for the plane(s). In one implementation, a mask, or a blocking material, is placed against the surface that does not need to be smoothed or further smoothed, may the surface be that of the edges, the planes, one of the edges, or one of the planes. The mask prevents the surface to be oxidized during the oxidation growth process and prevents the surface to the etched in the subsequent etching process. Thus, only the exposed surface is smoothed. In another implementation, the mask is made of a material that does not completely block the diffusion of oxygen, but makes the oxygen to diffuse at a slower rate. As a result, different oxide growth rate is achieved and different degree of smoothness is attained at different locations/surfaces. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method comprising:
   etching a silicon-on-insulator (SOI) substrate to form an optical waveguide having optical surfaces, wherein the optical surfaces include at least one of a rough etched edge and a rough etched plane having surface roughness;
   oxidizing a portion of the optical surfaces to form an oxidized region, wherein a diffusive mask is used to selectively vary a rate of diffusion of oxygen to selectively vary a rate of the oxidation of the oxidized region, the surface roughness varying within the portion according to the selective variation of the rate of diffusion of oxygen; and
   removing the oxidized region wherein the surface roughness of the optical surfaces is decreased.

2. The method of claim 1, wherein the rough etched edge is a wall with a high aspect ratio topological feature, the surface roughness being in the form of peaks and troughs on the optical surfaces.

3. The method of claim 1, further comprising preventing a particular portion of the at least one of the rough etched edge and the rough etched plane from being oxidized when oxidizing the optical surfaces, wherein the surface roughness of the particular portion is decreased at a different rate than another portion.

4. The method of claim 3, wherein the preventing of the particular portion from being oxidized is accomplished by utilizing blocking material that is placed against the particular portion, the blocking material slowing the oxidation growth rate at the particular portion.

5. The method of claim 1, wherein the oxidization of the portion of the optical surfaces and the removal of the oxidized region are performed repeatedly until a desired amount of smoothness is obtained.

6. The method of claim 1, wherein the removal of the oxidized portion is performed with a hydrofluoric acid based solution.

7. The method of claim 1, wherein the removal of the oxidized portion is performed with buffered oxide etches.

8. The method of claim 1, wherein at least one of the optical surfaces is a vertical wall in an anisotropic structure.

9. The method of claim 1, wherein at least one of the optical surfaces is realized at an angle.

10. The method of claim 9, wherein the at least one of the optical surfaces is at an angle and creates a low-back reflection interface between the optical waveguide having the at least one of the optical surfaces at an angle and at least one of an input optical fiber and an output optical fiber.

11. A method comprising:
etching a silicon-on-insulator (SOI) substrate to form an optical waveguide having optical surfaces with at least one of a rough etched edge and a rough etched plane, wherein the rough etched edge is a wall with a high aspect ratio topographic feature, the at least one of the rough etched edge and the rough etched plane having surface roughness;
providing a dry oxidation process to grow thermal oxidation on the etched SOI substrate, oxidizing at least a portion of the surface roughness on the at least one rough etched edge and rough etched plane, wherein a diffusive mask is used to selectively vary a rate of diffusion of oxygen to selectively vary a rate of the oxidation of the portion, the surface roughness varying within the portion according to the selective variation of the rate of diffusion of oxygen; and
removing the oxidized portion using an etchant, wherein the optical surfaces with at least one of the rough etched edge and the rough etched plane are smoothed.

12. The method of claim 11, wherein the dry oxidation process is performed with a flow of oxygen gas.

13. The method of claim 11, wherein the providing the dry oxidation process step and the removing step are performed repeatedly until a desired amount of smoothness is obtained.

14. A method comprising:
etching a silicon-on-insulator (SOI) substrate to form an optical waveguide having optical surfaces with at least one of a rough etched edge and a rough etched plane, wherein the rough etched edge is a wall with a high aspect ratio topographic feature, the at least one of the rough etched edge and the rough etched plane having surface roughness;
providing a wet oxidation process to grow thermal oxidation on the etched SOI substrate, oxidizing at least a portion of the surface roughness on the at least one rough etched edge and rough etched plane, wherein a diffusive mask is used to selectively vary a rate of diffusion of oxygen to selectively vary a rate of the oxidation of the portion, the surface roughness varying within the portion according to the selective variation of the rate of diffusion of oxygen; and
removing the oxidized portion using an etchant, wherein the optical surfaces with at least one of the rough etched edge and the rough etched plane is smoothed.

15. The method of claim 14, wherein the wet oxidation process is performed with a flow of oxygen and hydrogen gas, with the temperature for carrying out the wet oxidation process having a range from 800° C. to 1000° C.

16. The method of claim 14, wherein the providing the wet oxidation process step and the removing step are performed repeatedly until a desired amount of smoothness is obtained.

17. The method of claim 10, wherein the oxidization of the portion of the at least one of the optical surfaces at an angle and the removal of the oxidized region are performed repeatedly until a desired amount of smoothness is obtained and backscatter is reduced.

18. The method of claim 11, wherein the etchant is a hydrofluoric acid based solution (HF).

19. The method of claim 11, wherein the etchant is a buffered oxide etch (BOE).

20. The method of claim 14, wherein the etchant is a hydrofluoric acid based solution (HF).

21. The method of claim 14, wherein the etchant is a buffered oxide etch (BOE).

22. A method comprising:
etching a silicon-on-insulator (SOI) substrate to form an optical waveguide having optical surfaces with surface roughness, wherein the SOI substrate is formed by subjecting a silicon substrate to ion implantation to form a dielectric layer;
oxidizing a portion of the optical surfaces to form an oxidized region, wherein a diffusive mask is used to selectively vary a rate of diffusion of oxygen to selectively vary a rate of the oxidation of the oxidized region, the surface roughness varying within the portion according to the selective variation of the rate of diffusion of oxygen; and
removing the oxidized region wherein the surface roughness of the optical surfaces is decreased.

23. The method of claim 22, wherein the optical waveguide is formed by the etching, the optical surfaces including at least one of a rough etched edge and a rough etched plane.

24. The method of claim 23, wherein the rough etched edge is a wall with a high aspect ratio topological feature, the surface roughness being in the form of peaks and troughs on the optical surfaces.

25. The method of claim 23, further comprising preventing a particular portion of the at least one of the rough etched edge and the rough etched plane from being oxidized when oxidizing the optical surfaces, wherein the surface roughness of the particular portion is decreased at a different rate than another portion.

26. The method of claim 25, wherein the preventing of the particular portion from being oxidized is accomplished by utilizing blocking material that is placed against the particular portion, the blocking material slowing the oxidation growth rate at the particular portion.

27. The method of claim 22, wherein the oxidization of the portion of the optical surfaces and the removal of the oxidized region are performed repeatedly until a desired amount of smoothness is obtained.

28. The method of claim 22, wherein the removal of the oxidized portion is performed with a hydrofluoric acid based solution.

29. The method of claim 22, wherein the removal of the oxidized portion is performed with buffered oxide etches.

30. The method of claim 22, wherein at least one of the optical surfaces is a vertical wall in an anisotropic structure.

31. The method of claim 22, wherein at least one of the optical surfaces is realized at an angle.

32. The method of claim 31, wherein the at least one of the optical surfaces is at an angle and creates a low-back reflection interface between the optical waveguide having the at least one of the optical surfaces at an angle and at least one of an input optical fiber and an output optical fiber.

33. A method comprising:

etching a silicon-on-insulator (SOI) substrate to form an optical waveguide having optical surfaces with at least one of a rough etched edge and a rough etched plane, wherein the rough etched edge is a wall with a high aspect ratio topographic feature, the SOI substrate is formed by subjecting a silicon substrate to ion implantation to form a dielectric layer, the at least one of the rough etched edge and the rough etched plane having surface roughness;

providing a dry oxidation process to grow thermal oxidation on the etched SOI substrate, oxidizing at least a portion of the surface roughness on the at least one rough etched edge and rough etched plane, wherein a diffusive mask is used to selectively vary a rate of diffusion of oxygen to selectively vary a rate of the oxidation of the portion, the surface roughness varying within the portion according to the selective variation of the rate of diffusion of oxygen; and removing the oxidized portion using an etchant, wherein the optical surfaces with at least one of the rough etched edge and the rough etched plane are smoothed.

34. The method of claim 33, wherein the etchant is a hydrofluoric acid solution (HF).

35. The method of claim 33, wherein the etchant is a buffered oxide etch (BOE).

36. The method of claim 33, wherein the dry oxidation process is performed with a flow of oxygen gas.

37. The method of claim 33, wherein the providing the dry oxidation process step and the removing step are performed repeatedly until a desired amount of smoothness is obtained.

38. A method comprising:

etching a silicon-on-insulator (SOI) substrate to form an optical waveguide having optical surfaces with at least one of a rough etched edge and a rough etched plane, wherein the rough etched edge is a wall with a high aspect ratio topographic feature, the SOI substrate is formed by subjecting a silicon substrate to ion implantation to form a dielectric layer, the at least one of the rough etched edge and the rough etched plane having surface roughness;

providing a wet oxidation process to grow thermal oxidation on the etched SOI substrate, oxidizing at least a portion of the surface roughness on the at least one rough etched edge and rough etched plane, wherein a diffusive mask is used to selectively vary a rate of diffusion of oxygen to selectively vary a rate of the oxidation of the portion, the surface roughness varying within the portion according to the selective variation of the rate of diffusion of oxygen; and removing the oxidized portion using an etchant, wherein the optical surfaces with at least one of the rough etched edge and the rough etched plane are smoothed.

39. The method of claim 38, wherein the wet oxidation process is performed with a flow of oxygen and hydrogen gas, with the temperature for carrying out the wet oxidation process having a range from 800° C. to 1000° C.

40. The method of claim 38, wherein the providing the wet oxidation process step and the removing step are performed repeatedly until a desired amount of smoothness is obtained.

41. The method of claim 38, wherein the etchant is a hydrofluoric acid based solution (HF).

42. The method of claim 38, wherein the etchant is a buffered oxide etch (BOE).

* * * * *